(12) United States Patent
Chambers et al.

(10) Patent No.: US 7,749,024 B2
(45) Date of Patent: Jul. 6, 2010

(54) METHOD OF MANUFACTURING THHN ELECTRICAL CABLE, AND RESULTING PRODUCT, WITH REDUCED REQUIRED INSTALLATION PULLING FORCE

(75) Inventors: Terry Chambers, Carrollton, GA (US); Randy D. Kummer, Villa Rica, GA (US); John Armstrong, Villa Rica, GA (US); Philip Sasse, Douglasville, GA (US); David Reece, Carrollton, GA (US); Hai Lam, Douglasville, GA (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 11/675,441

(22) Filed: Feb. 15, 2007

(65) Prior Publication Data

US 2007/0243761 A1   Oct. 18, 2007

Related U.S. Application Data

(63) Continuation-in-part of application No. 11/120,487, filed on May 3, 2005, now abandoned, which is a continuation-in-part of application No. 10/952,294, filed on Sep. 28, 2004, now Pat. No. 7,411,129.

(51) Int. Cl.
  *H01R 13/58*   (2006.01)
(52) U.S. Cl. ...................................... 439/604
(58) Field of Classification Search ................. 439/587, 439/230, 239, 384; 29/483, 424
  See application file for complete search history.

(56) References Cited

U.S. PATENT DOCUMENTS

| | | | |
|---|---|---|---|
| 2,276,437 A | 3/1942 | Vaala | |
| 2,685,707 A | 8/1954 | Llewellyn et al. | |
| 2,930,838 A | 3/1960 | Chizallet et al. | |
| 3,064,073 A | 11/1962 | Downing et al. | |
| 3,108,981 A | 10/1963 | Clark et al. | |
| 3,191,005 A | 6/1965 | Cox, II | |
| 3,258,031 A * | 6/1966 | French | 138/127 |
| 3,378,628 A | 4/1968 | Garner | |
| 3,668,175 A | 6/1972 | Sattler | |
| 3,849,221 A * | 11/1974 | Middleton | 156/145 |

(Continued)

FOREIGN PATENT DOCUMENTS

DE   44 10 456 A1   3/1994

(Continued)

OTHER PUBLICATIONS

U.S. Appl. No. 60/544,224, Carlson et al.

(Continued)

*Primary Examiner*—Jean F Duverne
(74) *Attorney, Agent, or Firm*—Kenneth R. Glaser; Gardere Wynne Sewell, LLP

(57) ABSTRACT

Disclosed is type THHN cable having a reduced surface coefficient of friction, and the method of manufacture thereof, in which the central conductor core and insulating layer are surrounded by a nylon sheath. A high viscosity, high molecular weight silicone based pulling lubricant for THHN cable, or alternatively, erucamide or stearyl erucamide for small THHN gauge wire, is incorporated, by alternate methods, with the nylon material from which the outer sheath is extruded, and is effective to reduce the required pulling force on the cable during installation.

15 Claims, 6 Drawing Sheets

U.S. PATENT DOCUMENTS

| | | | |
|---|---|---|---|
| 3,852,875 A | 12/1974 | McAmis et al. | |
| 3,868,436 A | 2/1975 | Ootsuji et al. | |
| 3,877,142 A * | 4/1975 | Hamano et al. | 29/596 |
| 3,885,286 A * | 5/1975 | Hill | 29/745 |
| 4,002,797 A | 1/1977 | Hacker et al. | |
| 4,057,956 A | 11/1977 | Tolle | |
| 4,099,425 A * | 7/1978 | Moore | 74/502.5 |
| 4,100,245 A | 7/1978 | Horikawa et al. | |
| 4,137,623 A * | 2/1979 | Taylor | 29/433 |
| 4,273,806 A | 6/1981 | Stechler | |
| 4,274,509 A | 6/1981 | Thomson et al. | |
| 4,275,096 A * | 6/1981 | Taylor | 427/230 |
| 4,356,139 A | 10/1982 | Rowland et al. | |
| 4,360,492 A | 11/1982 | Rowland et al. | |
| 4,522,733 A | 6/1985 | Jonnes | |
| 4,568,420 A | 2/1986 | Nonni | |
| 4,569,420 A | 2/1986 | Pickett et al. | |
| 4,605,818 A | 8/1986 | Arroyo et al. | |
| 4,673,516 A | 6/1987 | Berry | |
| 4,684,214 A | 8/1987 | Goldmann et al. | |
| 4,693,936 A | 9/1987 | McGregor et al. | |
| 4,749,059 A | 6/1988 | Jonnes et al. | |
| 4,751,261 A | 6/1988 | Miyata et al. | |
| 4,806,425 A | 2/1989 | Chu-Ba | |
| 4,965,249 A | 10/1990 | De With et al. | |
| 5,036,121 A | 7/1991 | Coaker et al. | |
| 5,055,522 A | 10/1991 | Ikeda et al. | |
| 5,074,640 A | 12/1991 | Hardin et al. | |
| 5,225,635 A | 7/1993 | Wake et al. | |
| 5,227,080 A | 7/1993 | Berry | |
| 5,252,676 A | 10/1993 | Suyama et al. | |
| 5,326,638 A | 7/1994 | Mottine, Jr. et al. | |
| 5,356,710 A * | 10/1994 | Rinehart | 428/378 |
| 5,561,730 A | 10/1996 | Lochkovic et al. | |
| 5,565,242 A * | 10/1996 | Buttrick et al. | 427/230 |
| 5,614,482 A | 3/1997 | Baker et al. | |
| 5,656,371 A | 8/1997 | Kawahigashi et al. | |
| 5,660,932 A | 8/1997 | Durston et al. | |
| 5,733,823 A | 3/1998 | Sugioka et al. | |
| 5,753,861 A | 5/1998 | Hansen et al. | |
| 5,886,072 A | 3/1999 | Linsky et al. | |
| 5,912,436 A | 6/1999 | Sanchez et al. | |
| 6,057,018 A | 5/2000 | Schmidt | |
| 6,064,073 A | 5/2000 | Hoogenraad et al. | |
| 6,080,489 A | 6/2000 | Mehta | |
| 6,114,036 A * | 9/2000 | Rinehart et al. | 428/383 |
| 6,137,058 A * | 10/2000 | Moe et al. | 174/102 R |
| 6,146,699 A * | 11/2000 | Bonicel et al. | 427/299 |
| 6,159,617 A | 12/2000 | Foster et al. | |
| 6,188,026 B1 | 2/2001 | Cope et al. | |
| 6,228,495 B1 | 5/2001 | Lupia et al. | |
| 6,270,849 B1 | 8/2001 | Popoola et al. | |
| 6,281,431 B1 * | 8/2001 | Cumley | 174/25 G |
| 6,327,841 B1 | 12/2001 | Bertini et al. | |
| 6,347,561 B2 * | 2/2002 | Uneme et al. | 74/502.5 |
| 6,395,989 B2 | 5/2002 | Lecoeuvre et al. | |
| 6,416,813 B1 * | 7/2002 | Valls Prats | 427/118 |
| 6,418,704 B2 | 7/2002 | Bertini et al. | |
| 6,461,730 B1 | 10/2002 | Bachmann et al. | |
| 6,474,057 B2 | 11/2002 | Bertini et al. | |
| 6,534,717 B2 | 3/2003 | Suzuki et al. | |
| 6,565,242 B2 | 5/2003 | Dai et al. | |
| 6,640,533 B2 | 11/2003 | Bertini et al. | |
| 6,810,188 B1 | 10/2004 | Suzuki et al. | |
| 6,850,681 B2 | 2/2005 | Lepont et al. | |
| 6,903,264 B2 | 6/2005 | Watanabe et al. | |
| 6,906,258 B2 | 6/2005 | Hirai et al. | |
| 6,977,280 B2 | 12/2005 | Lee et al. | |
| 7,053,308 B2 | 5/2006 | Prats et al. | |
| 7,136,556 B2 | 11/2006 | Brown et al. | |
| 7,144,952 B1 | 12/2006 | Court et al. | |
| 7,411,129 B2 | 8/2008 | Kummer et al. | |
| 2002/0010252 A1 | 1/2002 | Lecoeuvre et al. | |
| 2002/0043391 A1 | 4/2002 | Suzuki et al. | |
| 2003/0098176 A1 | 5/2003 | Mesaki et al. | |
| 2004/0007308 A1 * | 1/2004 | Houston et al. | 156/54 |
| 2004/0198909 A1 | 10/2004 | Breitscheidel et al. | |
| 2005/0019353 A1 | 1/2005 | Prinz et al. | |
| 2005/0036753 A1 | 2/2005 | Will et al. | |
| 2005/0180725 A1 | 8/2005 | Carlson et al. | |
| 2007/0098340 A1 * | 5/2007 | Lee et al. | 385/109 |

FOREIGN PATENT DOCUMENTS

| | | |
|---|---|---|
| EP | 0 283 132 A2 | 9/1988 |
| EP | 0364717 A1 | 4/1990 |
| EP | 0544 411 A1 | 6/1993 |
| EP | 1 524 294 A1 | 4/2005 |
| FR | 2 674 364 A1 | 3/1991 |
| JP | 01110013 A | 4/1989 |
| JP | 01307110 A | 12/1989 |
| JP | 05266720 A | 10/1993 |
| JP | 06057145 A | 3/1994 |
| WO | WO-89/00763 | 1/1989 |
| WO | WO-00/40653 A1 | 7/2000 |
| WO | WO-01/081969 A1 | 11/2001 |
| WO | WO-01/90230 A1 | 11/2001 |
| WO | WO-2006016896 A1 | 2/2006 |
| WO | WO-2007/084745 A2 | 7/2007 |

OTHER PUBLICATIONS

Howard & Howard letter to Mr. Thomas C. Wright dated Feb. 7, 2008 re U.S. Appl. No. 11/675,441 (2pp).

Dow Corning Product Information sheet re Dow Corning MB50-011 composition, (4pp), attached to Cite No. A.

Dow Corning Product Information sheet re Dow Corning MB50-321 composition, Jan. 15, 2001 (2pp) (http://www.dowcorning.com).

Dow Corning Product Information sheet re Dow Corning MB25-504 composition, Jan. 2, 2002 (4pp) (http://www.dowcorning.com).

Dow Corning Product Information sheet re Dow Corning MB40-006 composition, Mar. 4, 2008 (1 pp) (http://www.downcorning.com).

Dow Corning Product Information sheet re Dow Corning MB50-001 composition, Jan. 15, 2001 (6pp) (http://www.dowcorning.com).

Dow Corning Product Information sheet re Dow Corning MB50-002 composition, Jan. 15, 2001 (4pp) (http://www.dowcorning.com).

Dow Corning Product Information sheet re Dow Corning MB50-320 composition, Mar. 4, 2008 (1 pp) (http://www.dowcorning.com).

Dow Corning Product Information sheet re Dow Corning MB50-004 composition, Jan. 15, 2001 (4pp) (http://www.dowcorning.com).

Dow Corning Product Information sheet re Dow Corning MB50-008 composition, Mar. 4, 2008 (1 pp) (http://www.dowcorning.com).

Dow Corning Product Information sheet re Dow Corning MB50-010 composition, Jan. 16, 2001 (2pp) (http://www.dowcorning.com).

Dow Corning Product Information sheet re Dow Corning MB50-011 composition, Mar. 4, 2008 (1pp) (http://www.dowcorning.com).

Dow Corning Product Information sheets re Dow Corning MB50-313 and MB50-314 composition, Jan. 15, 2001 (4pp) (http://www.dowcorning.com).

Dow Corning article "Siloxane additive minimizes friction in fibre optic cable conduit", 2001 (2pp) (http://www.dowcorning.com).

Crompton Corporation brochure on Amides (approx. 2003) (27pp).

Axel Plastics Research Laboratories, Inc., Product Data Sheet re "Mold Wiz, INT-33PA" (Approx. 2000) (1p).

Axel Plastics Research Laboratories, Inc., Product Data Sheet re "Mold Wiz, INT-40DHT" (Approx. 2001) (1p).

Axel Plastics Research Laboratories, Inc., Product Data Sheet re "Mold Wiz, INT-40GHT" (Approx. 2001) (1p).

E.I. Du Pont De Nemours and Company, Flyer entitled "Teflon", (Aug. 14, 2003)(1 p) (http://www.dupont.com).

General Electric Company, Brochure entitled "GE Silicones-Fluids, Emulsions & Specialties", (2001) (19pp).

WITCO Corporation, Brochure entitled "Fatty Acids, Glycerine, Triglycerides", (1997) (22pp).

Crompton Corporation, Brochure entitled "Vinyl Additives Product Guide", (2002) (16p).
Jun. 8, 2006 Office Action in U.S. Appl. No. 11/135,807.
Mar. 20, 2007 Office Action in U.S. Appl. No. 11/313,596.
Nov. 2, 2005 Office Action in U.S. Appl. No. 11/120,487.
Jun. 8, 2006 Office Action in U.S. Appl. No. 11/120,487.
Dec. 15, 2005 Office Action in U.S. Appl. No. 11/135,807.
United States Patent and Trademark Office, Office Action in U.S. Appl. No. 11/858,766, Jun. 9, 2008, 8 pp (US).
Dow Corning presentation entitled "MBs to Improve CoF—Injection Moulding & Extrusion"; from filed entitled "DC (multibase) Masterbatch training 2004.ppt"; date uncertain; 8 pages (US).
United States Patent and Trademark Office, Office Action in U.S. Appl. No. 11/675,441, Dec. 28, 2007 (4pp).
Richard E. Marquis, Adam J. Maltby; An Introduction to Fatty Acid Amid Slip and Anti-Blocking Agents; Polymer, Laminations & Coatings Conf., Aug. 30, 1998; pp. 942-952 (US).
J.B. Decoste; Friction of Vinyl Chloride Plastics; Society of Plastics Engineers Journal, vol. 25, Oct. 1969; pp. 67-71; Robert D. Forger (publisher), Manchester, NH (US).
Cerro Wire, Inc.; Request for Inter Partes Reexamination Under 35 U.S.C. §§311-318 (USPTO); Sep. 26, 2008; pp. 1-90 (US).
Southwire Company; Response to Request for Inter Partes Reexamination (USPTO); Oct. 21, 2008; pp. 1-27 (US).
United States Patent and Trademark Office; Office Action in Inter Partes Reexamination of U.S. 7,411,129 (Application/Control No. 95/000,403), Dec. 15, 2008, 19 pages (US).
United States Patent and Trademark Office; Office Action in U.S. Appl. No. 11/675,441; Oct. 6, 2008, 6 pages (US).
Southwire Company v. Cerro Wire, Inc.; Complaint for Patent Infringement and Demand for Jury Trial (with Exhibit A), Civil Action No. 3:08-CV-092-JTC, U.S.D.C.; Northern District of Georgia; Newnan Division; Aug. 12, 2008; 16 pp (US).
Southwire Company v. Cerro Wire, Inc.; Answer to Complaint for Patent Infringement and Demand for Jury Trial; Civil Action No. 3:08-CV-092-JTC; U.S.D.C.; Northern District of Georgia; Newnan Division; Oct. 16, 2008; 8 pp (US).
Southwire Company v. Cerro Wire, Inc.; Southwire Company's Motion, Memorandum and [Proposed] Order to Dismiss Cerro Wire Inc.'s Defenses of Invalidity Under 35 U.S.C. 102 and 103; Civil Action No. 3:08-CV-092-JTC; U.S.D.C.; Northern District of Georgia; Newnan Division; Jan. 2, 2009; 19 pp (US).
Southwire Company v. Cerro Wire, Inc.; Defendant Cerro Wire Inc.'s Motion to Stay Pending Reexamination of the Patent-In-Suit; Civil Action No. 3:08-CV-092-JTC; U.S.D.C.; Northern District of Georgia; Newnan Division; Dec. 12, 2008; 11 pp (US).
Southwire Company v. Cerro Wire, Inc.; Southwire's Opposition to Defendant's Motion for Stay Pending Reexamination of the Patent-In-Suit (with Declarations of Winn Wise and Holly S. Hawkins); Civil Action No. 3:08-CV-092-JTC; U.S.D.C.; Northern District of Georgia; Newnan Division; Jan. 2, 2009; 75 pp (US).
Southwire Company v. Cerro Wire, Inc.; Defendant Cerro Wire's Reply Memorandum in Support of its Motion to Stay Pending Reexamination of the Patent-In-Suit; Civil Action No. 3:08-CV-092-JTC; U.S.D.C.; Northern District of Georgia; Newnan Division; Jan. 16, 2009; 17 pp (US).
Southwire Company v. Cerro Wire, Inc.; Defendant Cerro Wire, Inc.'s Response to Plaintiff's Motion to Dismiss Cerro's Invalidity Defenses Under 35 U.S.C. 102 and 103; Civil Action No. 3:08-CV-092-JTC; U.S.D.C.; Northern District of Georgia; Newnan Division; Jan. 16, 2009; 7 pp (US).
Southwire Company v. Cerro Wire, Inc.; Southwire Company's Reply in Support of its Motion to Dismiss Cerro Wire Inc.'s Defenses of Invalidity Under 35 U.S.C. 102 and 103 and Further Opposition to Cerro Wire, Inc.'s Motion for Stay Pending Reexamination of the Patent-In-Suit; Civil Action No. 3:08-CV-092-JTC; U.S.D.C.; Northern District of Georgia; Newnan Division; Jan. 26, 2009; 16 pp (US).
United States Patent and Trademark Office; Order Granting/Denying Request for Inter Partes Reexamination of U.S. Pat. No. 7,411,129 (with attached PTO/SB/08) (Application/Control No. 95/000,403); Dec. 5, 2008; 25 pages (US).
United States Patent and Trademark Office, Office Action in U.S. Appl. No. 10/952,294, Mar. 14, 2007, 10 pp (US).
United States Patent and Trademark Office, Office Action in U.S. Appl. No. 10/952,294, Mar. 4, 2008, 6 pp (US).
United States Patent and Trademark Office, Office Action in U.S. Appl. No. 10/952,294, Jul. 12, 2006, 13 pp (US).
United States Patent and Trademark Office, Office Action in U.S. Appl. No. 10/952,294, Aug. 7, 2007, 11 pp (US).
United States Patent and Trademark Office, Office Action in U.S. Appl. No. 12/017,222, Aug. 7, 2008, 8 pp (US).
United States Patent and Trademark Office, Office Action in U.S. Appl. No. 11/858,766, Feb. 9, 2009, 11 pp (US).
Extended European Search Report for European Application No. EP 06739714.1, dated Nov. 12, 2009.
International Search Report and Written Opinion Mailed Aug. 21, 2006 from WO 2007/81372 (International App. No. PCT/US06/11069).
International Search Report Mailed Oct. 20, 2006 from WO 2006/127711 (International App. No. PCT/US06/19923).
International Search Report Mailed Dec. 20, 2005 from WO 2006/16895 (International App. No. PCT/US05/05165).
Examination Report for New Zealand Application No. 564551, dated Aug. 14, 2009.
United States Patent and Trademark Office, Notice of Allowance in U.S. Appl. No. 12/017,222, Dec. 5, 2008 (12 pp).
United States Patent and Trademark Office, Notice of Allowance in U.S. Appl. No. 12/017,222, Jan. 8, 2009 (11 pp).
United States Patent and Trademark Office, Notice of Allowance in U.S. Appl. No. 12/017,222, Feb. 27, 2009 (8 pp).
United States Patent and Trademark Office; Office Action in Inter Partes Reexamination of U.S. 7,411,129 (Application/Control No. 95/000,403), Dec. 5, 2008, 26 pages (US).
Southwire Company vs. Cerro Wire, Inc.; Court Order Granting Stay of Litigation pending USPTO's Reexamination of U.S. Patent No. 7,411,129, Civil Action No. 3:08-CV-092-JTC; U.S.D.C.; Northern District of Georgia, Newnan Division, May 12, 2009, 13 pp. (US).
Southwire Company v. Encore Wire Corporation and Cerro Wire, Inc.; Southwire Company's Answer to Encore Wire Corporation's First Amended Answer, Affirmative Defenses, and Counterclaims, Civil Action No. 6:09-cv-289-LED; U.S.D.C. for the Eastern District of Texas, Tyler Division, Feb. 12, 2010, 17 pp. (US).

* cited by examiner

US 7,749,024 B2

METHOD OF MANUFACTURING THHN ELECTRICAL CABLE, AND RESULTING PRODUCT, WITH REDUCED REQUIRED INSTALLATION PULLING FORCE

CROSS REFERENCE TO RELATED APPLICATION

This application is a continuation-in-part of application Ser. No. 11/120,487, filed May 3, 2005, now abandoned, which is a continuation-in-part of application Ser. No. 10/952,294, filed Sep. 28, 2004, now U.S. Pat. No. 7,411,129. Each patent application identified above is incorporated here by reference in its entirety.

FIELD OF THE INVENTION

The present invention relates to electrical cables, more particularly to THHN electrical cables, and even more particularly to methods for reducing the surface coefficient of friction and required installation pulling force thereof, as well as preferred pulling lubricant compositions for effecting such reductions.

BACKGROUND OF THE INVENTION

Electrical cables include a conductor core and typically include an outer jacket or sheath. The term "sheath," as used herein and throughout the specification and claims, is defined to mean the outermost protective jacket or covering surrounding a conductor core, whether of a single type material or multiple layers of the same or different material. The conductor core may typically be, for example, a single metal wire, multiple small wires twisted together to make a "stranded" cable, or multiple insulated wires or other type electrical conductors acting together to serve a particular function (e.g., three-phase connection). The sheath may comprise one or more layers of polymeric or other material to provide physical, mechanical, electrical insulating and/or chemical protection for the underlying cable components. For the purpose of type THHN cable of the present invention, the exterior portion of the sheath is of nylon. Specifically, type THHN cable comprises a conductor core of a single solid or stranded conductor, surrounded by a layer of polyvinyl chloride (PVC) electrical insulation, covered by an outer layer of nylon.

Installation of electrical cable often requires that it be pulled through tight spaces or small openings in, and in engagement with, narrow conduits, raceways, cabletrays, or passageways in rafters or joists. This becomes problematic since the exterior surface of the cable sheath normally has a high coefficient of friction, therefore requiring a large pulling force. Moreover, installation parameters include maximum allowable cable pulling tension and/or sidewall pressure limits. Exceeding these limits can result in degradation of the cable, physical damage and inferior installation.

To overcome this problem, the general industry practice has been to coat the exterior surface of the cable sheath with a pulling lubricant at the job site in order to reduce the coefficient of friction between this surface and the conduit walls or like surfaces, typically using vaselines or lubricants produced specifically, and well known in the industry for such purpose, such as Yellow 77® (hereinafter, "Y 77"). The term "pulling lubricant," as used herein and throughout the specification and claims, is defined to mean lubricating material which sufficiently reduces the coefficient of friction of the exterior surface of the sheath of the cable to facilitate the pulling of the cable.

The aforementioned industry practice of applying a pulling lubricant like Y 77 to the finished cable at the job site poses problems, principally due to the additional time, expense and manpower required to lubricate the finished cable surface at the job site as well as to clean up after the lubricating process is completed. Alternative solutions have been tried but are generally unsuccessful, including the extrusion of a lubricant layer over the extruded polymeric sheath during the manufacturing of the cable, or the application of granules of material to the still-hot sheath during the extrusion process, which granules are designed to become detached when the cable is pulled through the duct. However, these solutions not only require major alterations of the manufacturing line, but result in a loss in manufacturing time, increased economic costs, and undesirable fluctuations in the geometrical dimensions of the cable sheaths.

It is also important to an understanding of the present invention to know the difference between what are referred to as "pulling lubricants" and what are "processing lubricants." A pulling lubricant is a lubricant that appears at the outside surface of the sheath of the cable and is effective to lower the surface coefficient of friction such as to reduce the force necessary to pull the cable along or through building surfaces or enclosures. A processing lubricant is lubricating material that is used to facilitate the cable manufacturing process, such as the flow of polymer chains during any polymer compounding as well as during the extrusion processes while the polymer is in its molten or melt phase. Cable manufacturers have long used processing lubricants, such as stearic acid or ethylene bis-stearamide wax, as a minor component of the polymeric compound from which the cable sheath is formed. Because a processing lubricant is normally not effective except when the polymer is in this melt phase, the effect of a processing lubricant is essentially non-existent in the final hardened polymer sheath of the cable. Even where there may be an excessive amount of the processing lubricant, a separate pulling lubricant would still be required to sufficiently reduce the cable sheaths' exterior surface coefficient of friction in order to minimize the pulling force necessary to install the cable.

Accordingly, there has been a long-felt need for an effective method of providing a pulling lubricant at the exterior surface of the finished cable, and particularly the finished THHN cable, which is effective to reduce the cable surface coefficient of friction and minimize the required installation pulling force, without incurring the inconvenience and time-consuming operation and expense associated with the application of the pulling lubricant at the installation site, nor significantly increasing the complexity and cost of the manufacturing process, nor undesirably altering the geometrical characteristics of the cable sheaths.

SUMMARY OF THE INVENTION

The process of the present invention accomplishes these objectives for THHN cable by a cable manufacturing process in which a particular pulling lubricant, of optimum weight percentage or quantity, is introduced into the manufacturing process at a particular stage of manufacture, which results in the pulling lubricant being present in the outer sheath, so that it is available to reduce the coefficient of friction of the exterior sheath surface when the cable is to be installed. Depending upon the material of the sheath and the type of lubricant, this may be as a consequence of the migration, or delayed migration or "blooming," of the pulling lubricant to the sheath surface; or alternatively, due to the permeation of the pulling lubricant throughout the sheath. Under these circumstances, the pulling lubricant is effective to lower the surface coefficient of friction below that of the inherent coefficient of friction of the material from which the outer layer of the THHN sheath is formed, thereby reducing the required installation pulling force.

In accordance with the process of the invention, and as described below in greater detail, the pulling lubricant is selectively chosen to provide the optimum results with respect to the particular nylon sheath material, and may alternately be introduced into the THHN cable manufacturing process at various stages, ranging from the initial compounding of the lubricant with the polymeric nylon material to form lubricated pellets from which the sheath is to be formed, to mixing the lubricant with the nylon sheath material before introduction of the mixture into the extrusion process, to its introduction into the sheath extrusion process while the nylon sheath forming material is in its molten state.

BRIEF DESCRIPTION OF THE DRAWINGS

These and other details and aspects of the invention, as well as the advantages thereof, will be more readily understood and appreciated by those skilled in the art from the following detailed description, taken in conjunction with the accompanying drawings, in which.

DESCRIPTION OF THE PREFERRED
EMBODIMENTS OF THE INVENTION

Figure 1:
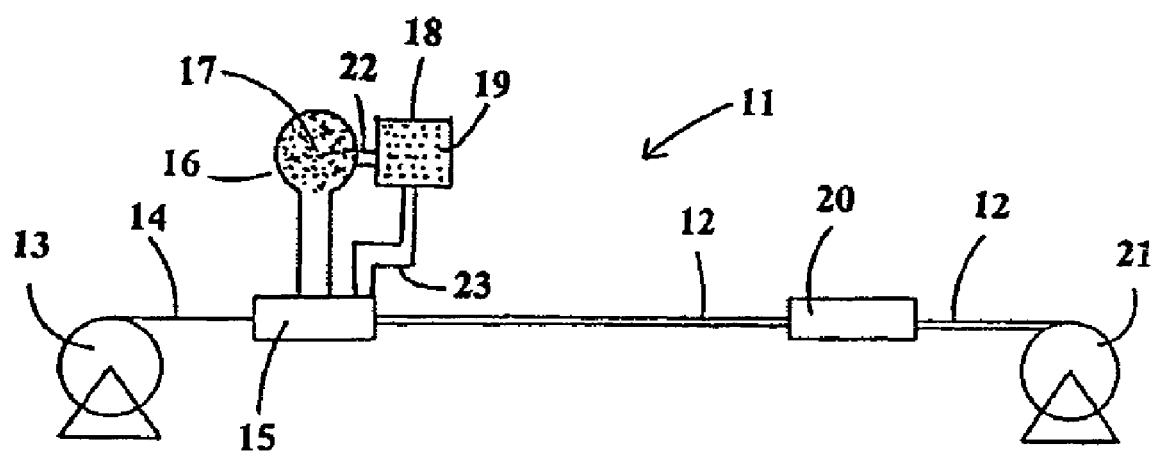
FIG. 1 is a diagrammatic representation of typical equipment used in the manufacture of cable in accordance with the present invention, when mixing the lubricant with the nylon material prior to extrusion.

Referring initially to FIG. 1, there is depicted typical equipment 11 for manufacturing electrical cable 12 in accordance with one process of the present invention. The outer sheath of the cable is of an extruded polymer material, specifically nylon. The equipment 11 may include a reel 13 which supplies conductor wire 14 to an extruding head 15. In flow communication with the extrusion head is a tank 16 of the nylon pellets 17. A tank 18 with the desired pulling lubricant 19 is adapted to be in flow communication with the tank 16 by way of conduit 22, thus enabling the mixing of the pulling lubricant with the nylon pellets 17, the mixture thereafter introduced into the extruder. Alternatively, the tank may be adapted to be in fluid communication with the extruder or extrusion head 15, by way of conduit 23, downstream from the point of entry of the nylon material, thus allowing the pulling lubricant to mix with the nylon material while in its molten state in the extruder or extruder head. A cooling box 20 for cooling the extruded product is provided, and a reel 21 is positioned for taking up the resulting cable assembly 12. When the final cable construction is such that there are multiple layers of sheath material, the pulling lubricant should desirably be incorporated into the outermost layer.

As is therefore evident, the pulling lubricant can be mixed with the material from which the outer sheath is to be extruded prior to extrusion or, alternatively, introduced into the extruding head for subsequent mixing with the molten extrusion material as the sheath is being formed. As a further alternative, the pulling lubricant can be initially compounded with the polymeric material of the pellets themselves in a process upstream of that depicted in FIG. 1, thereby forming lubricated polymeric pellets, thus eliminating the need for tank 18 and conduits 22 and 23.

Polymeric materials that can be used for an insulating layer or outer sheath of different type of cable include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like. As previously described, for the THHN cable of the present invention, the conductor core of a single solid or stranded conductor is surrounded by an insulating layer of PVC covered by an outer sheath of a polyamide (e.g., nylon).

In accordance with the testing subsequently described, it has been determined that, for THHN cable, silicone oil is the preferred pulling lubricant. For small gauge THHN wire, erucamide is an alternative preferred pulling lubricant, to be incorporated in the nylon sheath.

The efficacy of these pulling lubricants for the nylon sheath, and specifically an optimum range for the quantity of such lubricants, in accordance with the invention, has been proven by the use of various tests. Prior to discussing the results of such tests, these test methods and their equipment are described as follows:

Testing Methods
 Coefficient of Friction Test

Figure 4:
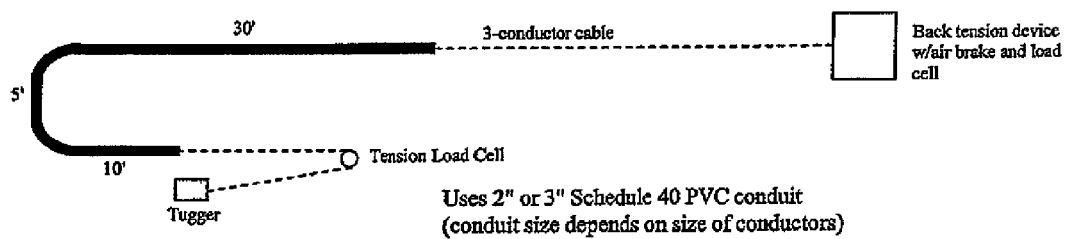
FIGS. 4 and 5 are representations of test devices which may be used to create the aforementioned test data.

Referring now to FIG. 4, diagrammatically illustrated is the apparatus for a coefficient of friction test. The coefficient of friction test apparatus was developed to give a consistent way to determine the input values necessary to use the industry-standard program published by PolyWater Corporation to calculate a real-world coefficient of friction for a given cable being pulled in conduit. Given the inputs for the conduit setup, the back tension on the wire, and the pulling tension on the pulling rope, this program back-calculated a coefficient of friction for the cable by subtracting the back tension from the pulling tension and attributing the remaining tension on the rope to frictional forces between the cable and the conduit.

The overall setup used a pulling rope threaded through ~40' of PVC conduit (appropriately sized for the cable being pulled) with two 90° bends. Three 100' pieces of THHN cable were cut and laid out parallel to one another in line with the first straight section of conduit, and the rope connected to them using industry-standard practice. The other end of the THHN cable was attached to a metal cable which was wrapped around a cylinder with an air brake to allow the application of constant back tension on the setup.

The metal cable was threaded through a load cell so that it could be monitored in real-time, and continuously logged. The pulling rope was similarly threaded through a load cell and constantly monitored and logged. Values for both back tension and pulling tension were logged for the time it took to pull cable through the conduit run. These values were then averaged and used in the PolyWater program to calculate coefficient of friction.

Specific Type THHN Tests

Figure 5:
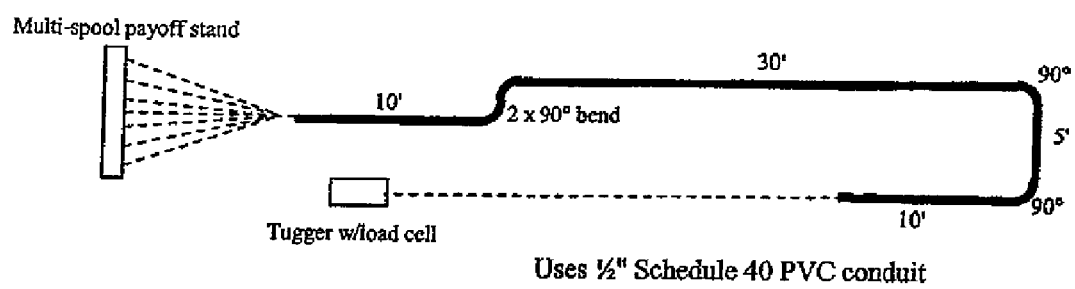

Initial tests of small gauge Type THHN wire were performed using the small-scale tension tester shown in FIG. 5. In this test, multiple individual American Wire Gauge (AWG)

size 12 THHN wires were provided on the payoff and attached to a metal pulling tape that was threaded through an arrangement of ½" conduit that included about 50 feet of straight conduit and four 90° bends. A pulling rope was attached to the other end of the pulling tape and a tugger was used to pull the cable arrangement through the conduit. The rope was threaded through a pulley arrangement that used a load cell to monitor rope tension while the wire was pulled through the conduit. This tension was continuously logged and averaged to give an average pulling force for the pull. This force correlated directly to the coefficient of friction for the cable.

Figure 2:
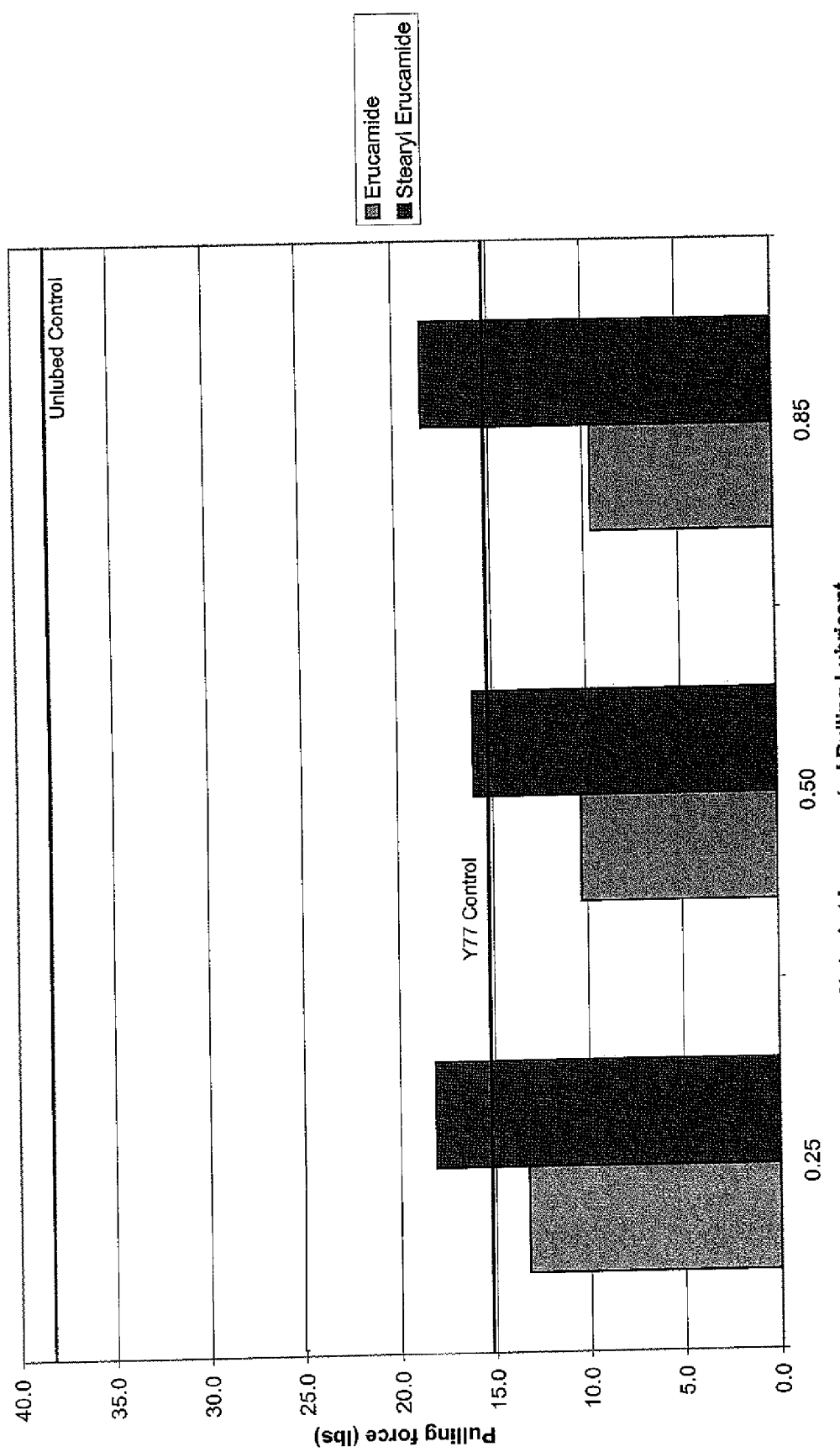
FIG. 2 is a graphical representation of test data comparing the effect of different pulling lubricants in small size THHN cable in which the outer sheath material is nylon.

Using the data obtained from the small scale pull test of FIG. 5, FIG. 2 illustrates a comparison of the different required pulling forces for a small gauge cable consisting of multiple (AWG) size 12 THHN conductors. The test subjects had 0.25-0.85% of two different potential pulling lubricants, erucamide and stearyl erucamide, mixed into the outer nylon sheath. Results of the test are shown in FIG. 2 and compared to the results for the standard THHN product without any pulling lubricant and with the externally applied industry-standard Y77. This test shows that erucamide is one preferred lubricant for small gauge THHN cable, in an optimum percentage of approximately 0.85%, by weight.

Figure 3:
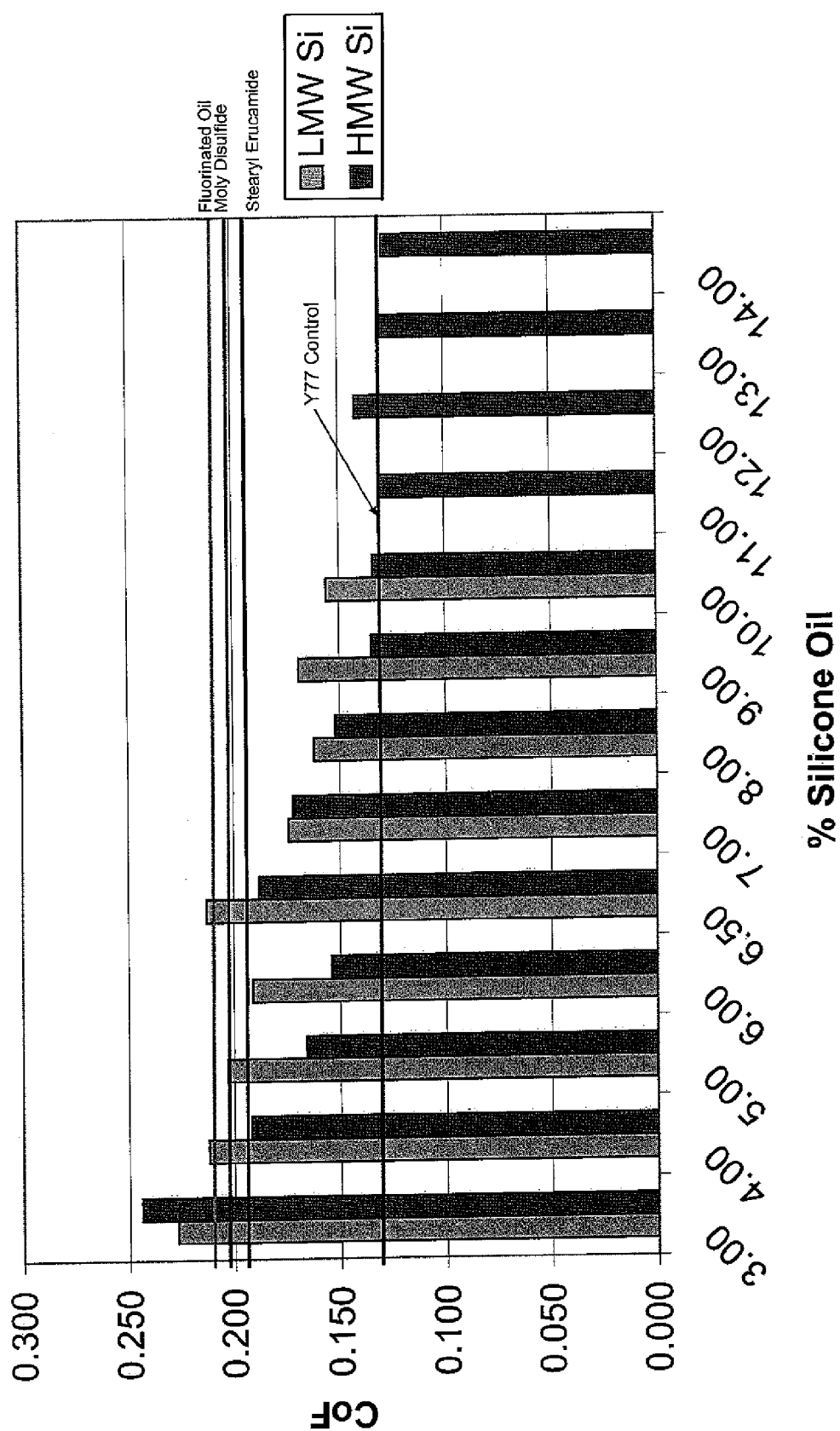
FIG. 3 is a graphical representation of test data comparing both the effects of different pulling lubricants and different percentages of pulling lubricant in large size THHN cable in which the outer sheath material is nylon.

Next, large gauge Type THHN cable was tested. Using the coefficient of friction test of FIG. 4, FIG. 3 illustrates the different values of surface coefficient of friction of the exterior surface of the sheath, for cables consisting of three individual large gauge AWG 4/0 THHN conductors, for varying percentages of the pulling lubricant, silicone oil, of varying molecular weights. The two lubricants compared in FIG. 3 are a high-molecular weight silicone oil (HMW Si) and a lower molecular weight silicone oil (LMW Si). Comparison results are shown for this same THHN cable arrangement lubricated with industry-standard Y77, as well as with respect to three other trial pulling lubricants, fluorinated oil, molydisulfide, and stearyl erucamide. The results in FIG. 3 illustrate that, while other pulling lubricants can reduce the coefficient of friction of the exterior surface of the cable, the preferred pulling lubricant for THHN cable, and particularly large gauge THHN cable, is a high molecular weight silicone oil added at a level of approximately 9%, by weight, or higher.

In accordance with an advantage of the present invention, the pulling lubricant that is incorporated in the sheath is present at the outer surface of the sheath when the cable engages, or in response to the cable's engagement with, the duct or other structure through which the cable is to be pulled. For the THHN cable of the present invention, where the outer sheath is of nylon and the preferred pulling lubricant is high molecular weight silicone oil, this silicon-based lubricant permeates the entire nylon sheath portion and is, in effect, continuously squeezed to the sheath surface in what is referred to as the "sponge effect," when the cable is pulled through the duct.

Compounding with Pulling Lubricant

As previously described, the pulling lubricant may be incorporated into the extruded sheath (or the outer layer of the cable sheath if the sheath is of multiple layers) by initially compounding the lubricant with the (outer) sheath material to be extruded. To prepare the lubricated blend of the present invention, the resin and additional components, including the pulling lubricant, are fed into any one of a number of commonly used compounding machines, such as a twin-screw compounding extruder, Buss kneader, Banbury mixer, two-roll mill, or other heated shear-type mixer. The melted, homogeneous blend is then extruded into strands or cut into strips that may be subsequently chopped into easily handled pellets. The so-prepared lubricated pellets are then fed into the extruder for forming the outer sheath.

THHN cable

THHN and THWN-2 are types of insulated electrical conductors that cover a broad range of wire sizes and applications. THHN or THWN-2 conductors are typically 600 volt copper conductors with a sheath comprising an outer layer of nylon surrounding a layer of thermoplastic insulation and are heat, moisture, oil, and gasoline resistant. THHN cable is primarily used in conduit and cable trays for services, feeders, and branch circuits in commercial or industrial applications as specified in the National Electrical Code and is suitable for use in dry locations at temperatures not to exceed 90° C. Type THWN-2 cable is suitable for use in wet or dry locations at temperatures not to exceed 90° C. or not to exceed 75° C. when exposed to oil or coolant. Type THHN or THWN-2 conductors are usually annealed (soft) copper, insulated with a tough, heat and moisture resistant polyvinylchloride (PVC), over which a polyamide layer, specifically nylon, is applied. Many cables, including those addressed by the present invention, can be "multi-rated," simultaneously qualifying for rating as THHN or THWN-2.

Figure 6:
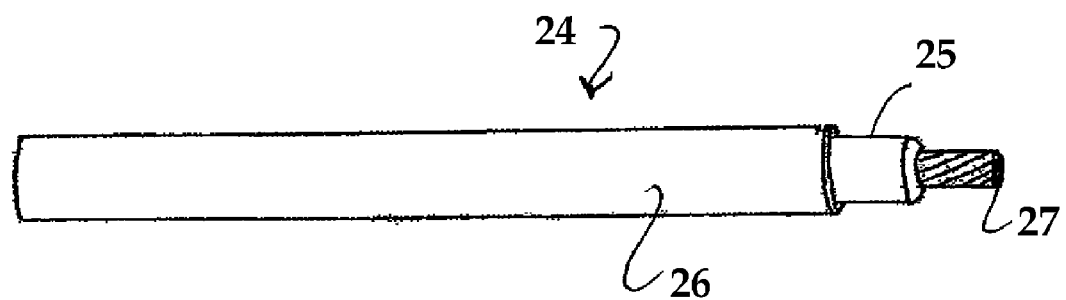
FIG. 6 is a section view of a THHN cable produced in accordance with the process of the present invention.

Referring now to FIG. 6, there is illustrated a THHN cable 24 constructed in accordance with the process of the invention. The cable is characterized by a sheath comprising an extruded layer 25 of PVC insulation material and an overlying extruded thin layer 26 of nylon, the sheath surrounding a central electric conductor 27 which is usually, though not exclusively, of copper. The only limitation on the type of pulling lubricant to be incorporated into the extruded outer nylon sheath is that it be sufficiently compatible with nylon to be co-processed with it, and particularly when compounded with nylon, that it be robust enough to withstand the high processing temperature for nylon, which is typically about 500° F. However, it has been found that for THHN cable, this lubricant is preferably a high molecular weight, high viscosity silicone fluid; for small gauge THHN wire, as an alternative, erucamide or stearyl erucamide.

Two industry-standard processes can be used to produce this product, the so called co-extrusion method and the tandem extrusion method. In both processes, the conductor, either solid or stranded, is first introduced into the extrusion head where the heated, melted PVC insulation compound is introduced and applied to the circumference of the conductor. In the co-extrusion process, the melted nylon compound is introduced into the same extrusion head and applied together with the PVC to the conductor, in a two-layer orientation. In the tandem process the PVC-coated conductor leaves the first extrusion head and is introduced into a second, separate extrusion head where the melted nylon is applied to the surface. In both cases, the final product is then introduced into a cooling water bath and ultimately the cooled product is wound onto reels. In either case, the nylon material is preferably initially compounded with the pulling lubricant to provide the so-lubricated extrusion pellets.

As shown in FIG. 2, small gauge THHN cable prepared, as described, with nylon as the outer layer of the sheath, and containing 0.25%, 0.50% and 0.85%, by weight, of stearyl erucamide, had an average pulling force of 18.1 lbs., 16 lbs. and 18.5 lbs., respectively. Even better, small gauge THHN cable containing 0.25%, 0.50% and 0.85%, by weight, of erucamide had an average pulling force of 13.2 lbs., 10.3 lbs. and 9.6 lbs., respectively. Comparably, the pulling force for a THHN cable with no pulling lubricant was measured at 38.5 lbs., and THHN cable with only Y 77 applied to the exterior surface was measured at 15.3 lbs. FIG. 3, on the other hand, illustrates the results when silicone oil is used in THHN cable, compared to other potential lubricants, illustrating silicone oil as a much preferred pulling lubricant for this type cable.

Although the aforementioned description references specific embodiments and processing techniques of the invention, it is to be understood that these are only illustrative. For example, although the description has been with respect to electrical cable, it is also applicable to other types of non-electrical cable such as, for example, fiber optic cable. Additional modifications may be made to the described embodiments and techniques without departing from the spirit and the scope of the invention as defined solely by the appended claims.

What is claimed is:

1. In a THHN electrical cable of the type comprising a conductor core and sheath surrounding said conductor core, in which the sheath has at least its exterior portion formed of nylon material, an improvement in which a erucamide pulling lubricant, introduced in said material during the manufacture of the cable but prior to the formation of said sheath, either permeates throughout, or migrates through, at least said exterior portion of the sheath to be available at the exterior surface of said sheath as said THHN cable is pulled along an installation surface, and in a concentration sufficient to reduce the required installation pulling force.

2. The improvement as defined by claim 1 in which the pulling lubricant is erucamide in a concentration, by weight, of approximately 0.85%.

3. The improvement as defined by claim 1 in which the pulling lubricant is erucamide in a concentration, by weight, of between about 0.25% and 0.85%.

4. An improved process of manufacturing a finished THHN cable assembly of the type comprising a central conductor core and a surrounding sheath of at least one outer layer of nylon material defining the exterior surface of the finished cable, said process comprising:
   (a) combining a silicone based pulling lubricant with said nylon material prior to the formation of said outer layer of said sheath, the silicone based pulling lubricant being of a concentration sufficient to reduce the required installation pulling force of the cable during its installation, and further of the type which permeates throughout the at least one outer layer of the sheath to be available at the said exterior surface as said THHN cable is pulled along an installation surface; and
   (b) extruding said combined silicone based pulling lubricant and said nylon material to surround said central conductor core with at least said outer layer.

5. The process as defined by claim 4 in which the silicone based pulling lubricant is high molecular weight silicone oil.

6. The process as defined by claim 4 in which the concentration, by weight, of the silicone based pulling lubricant is at least 9% by weight.

7. The process as defined by claim 5 in which the concentration, by weight, of the high molecular weight silicone oil is at least 9% by weight.

8. An improved process of manufacturing a finished THHN cable of the type comprising a central conductor and a surrounding sheath, at least an outer portion of which is of nylon material, the process comprising introducing a erucamide pulling lubricant into the sheath prior to the completion of the manufacturing of the finished THHN cable of a concentration of between about 0.25% and 0.85%, by weight, to be available at the exterior surface of the sheath, and sufficient to reduce the required pulling force during the THHN cable's installation.

9. In a THHN electrical cable of the type comprising a conductor core and a sheath surrounding said conductor core, in which the sheath has at least its exterior portion formed of nylon material, an improvement in which a silicone based pulling lubricant, introduced in said material during the manufacture of the cable but prior to the formation of said sheath, permeates throughout at least said exterior portion of the sheath to be available at the exterior surface of said sheath as said THHN cable is pulled along an installation surface, and in a concentration sufficient to reduce the required installation pulling force.

10. The process as defined by claim 9 in which the silicone based pulling lubricant is high molecular weight silicone oil.

11. The process as defined by claim 10 in which the concentration, by weight, of the high molecular weight silicone oil is at least 9% by weight.

12. The process as defined by claim 9 in which the concentration, by weight, of the silicone based pulling lubricant is at least 9% by weight.

13. An improved process of manufacturing a finished THHN cable assembly of the type comprising a central conductor core and a surrounding sheath of at least one outer layer of nylon material defining the exterior surface of the finished cable, said process comprising:
   (a) combining a erucamide pulling lubricant with said nylon material prior to the formation of said outer layer of said sheath, the erucamide pulling lubricant being of a concentration sufficient to reduce the required installation pulling force of the cable during its installation, and further of the type which either permeates throughout, or migrates through, the at least one outer layer of the sheath to be available at the said exterior surface as said THHN cable is pulled along an installation surface; and
   (b) extruding said combined erucamide pulling lubricant and said nylon material to surround said central conductor core with at least said outer layer.

14. The process as defined by claim 13 in which the erucamide pulling lubricant is in a concentration, by weight, of approximately 0.85%.

15. The process as defined by claim 13 in which the erucamide pulling lubricant is in a concentration, by weight, of between about 0.25% and 0.85%.

* * * * *

INTER PARTES REEXAMINATION CERTIFICATE (1300th)
United States Patent
Chambers et al.

(10) Number: US 7,749,024 C1
(45) Certificate Issued: Jul. 13, 2016

(54) METHOD OF MANUFACTURING THHN ELECTRICAL CABLE, AND RESULTING PRODUCT, WITH REDUCED REQUIRED INSTALLATION PULLING FORCE

(75) Inventors: Terry Chambers, Carrollton, GA (US); Randy D. Kummer, Villa Rica, GA (US); John Armstrong, Villa Rica, GA (US); Philip Sasse, Douglasville, GA (US); David Reece, Carrollton, GA (US); Hai Lam, Douglasville, GA (US)

(73) Assignee: SOUTHWIRE COMPANY, Carrollton, GA (US)

Reexamination Request:
No. 95/000,594, Nov. 17, 2010

Reexamination Certificate for:
Patent No.: 7,749,024
Issued: Jul. 6, 2010
Appl. No.: 11/675,441
Filed: Feb. 15, 2007

Related U.S. Application Data

(63) Continuation-in-part of application No. 11/120,487, filed on May 3, 2005, now abandoned, which is a continuation-in-part of application No. 10/952,294, filed on Sep. 28, 2004, now Pat. No. 7,411,129.

(51) Int. Cl.
*H01R 13/58* (2006.01)
*H01B 13/24* (2006.01)
(Continued)

(52) U.S. Cl.
CPC ............. *H01B 13/24* (2013.01); *B29C 47/0016* (2013.01); *B29C 47/0023* (2013.01); *B29C 47/025* (2013.01); *C08K 5/20* (2013.01); *H01B 3/22* (2013.01); *H01B 3/465* (2013.01); *H01B 13/145* (2013.01); *H01B 13/22* (2013.01); *B29C 47/065* (2013.01); *B29C 47/1027* (2013.01); *B29C 47/1054* (2013.01); *B29C 47/1063* (2013.01); *B29C 47/28* (2013.01); *B29C 47/40* (2013.01); *B29C 47/8815* (2013.01); *B29C 47/94* (2013.01); *B29K 2023/06* (2013.01); *B29K 2023/12* (2013.01); *B29K 2027/06* (2013.01); *B29K 2067/00* (2013.01); *B29K 2077/00* (2013.01); *B29K 2105/0005* (2013.01); *B29L 2031/3462* (2013.01); *Y10T 29/49117* (2015.01)

(58) Field of Classification Search
None
See application file for complete search history.

(56) References Cited

To view the complete listing of prior art documents cited during the proceeding for Reexamination Control Number 95/000,594, please refer to the USPTO's public Patent Application Information Retrieval (PAIR) system under the Display References tab.

*Primary Examiner* — Anjan K. Deb

(57) ABSTRACT

Disclosed is type THHN cable having a reduced surface coefficient of friction, and the method of manufacture thereof, in which the central conductor core and insulating layer are surrounded by a nylon sheath. A high viscosity, high molecular weight silicone based pulling lubricant for THHN cable, or alternatively, erucamide or stearyl erucamide for small THHN gauge wire, is incorporated, by alternate methods, with the nylon material from which the outer sheath is extruded, and is effective to reduce the required pulling force on the cable during installation.

At the time of issuance and publication of this certificate, the patent remains subject to pending reexamination control number 95/000573 filed Oct. 8, 2010. The claim content of the patent may be subsequently revised if a reexamination certificate issues from the reexamination proceeding.

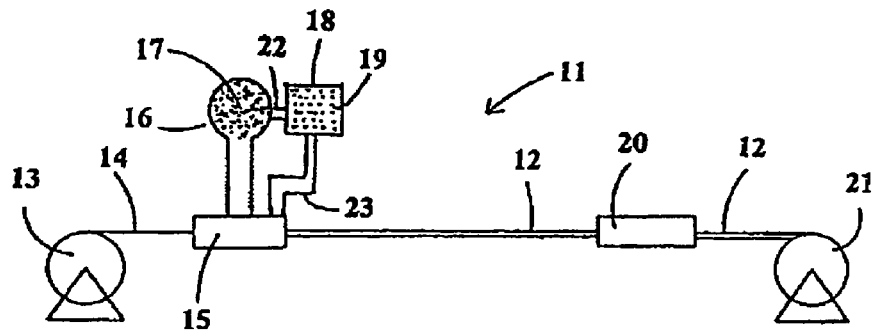

(51) Int. Cl.
*B29C 47/02* (2006.01)
*C08K 5/20* (2006.01)
*H01B 3/22* (2006.01)
*H01B 3/46* (2006.01)
*H01B 13/14* (2006.01)
*H01B 13/22* (2006.01)
*B29C 47/00* (2006.01)
*B29C 47/06* (2006.01)
*B29C 47/10* (2006.01)
*B29C 47/28* (2006.01)
*B29C 47/40* (2006.01)
*B29C 47/88* (2006.01)
*B29C 47/94* (2006.01)
*B29K 23/00* (2006.01)
*B29K 27/06* (2006.01)
*B29K 67/00* (2006.01)
*B29K 77/00* (2006.01)
*B29K 105/00* (2006.01)
*B29L 31/34* (2006.01)

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-15 are cancelled.

* * * * *